(12) United States Patent
Govindaraju

(10) Patent No.: US 8,407,385 B2
(45) Date of Patent: Mar. 26, 2013

(54) BUS ARBITRATION SYSTEM, A METHOD OF CONNECTING DEVICES OF AN IC EMPLOYING A BUS SYSTEM AND AN IC

(75) Inventor: Balaji Govindaraju, Bangalore (IN)

(73) Assignee: LSI Corporation, Allentown, PA (US)

( * ) Notice: Subject to any disclaimer, the term of this patent is extended or adjusted under 35 U.S.C. 154(b) by 1035 days.

(21) Appl. No.: 12/412,355

(22) Filed: Mar. 26, 2009

(65) Prior Publication Data

US 2010/0250808 A1    Sep. 30, 2010

(51) Int. Cl.
*G06F 13/36* (2006.01)
(52) U.S. Cl. ........................... 710/116; 709/211
(58) Field of Classification Search .......... 710/113–125, 710/110, 316–317; 370/359; 709/211
See application file for complete search history.

(56) References Cited

U.S. PATENT DOCUMENTS

| 7,512,729 | B2 * | 3/2009 | Bose et al. ............ 710/111 |
| 2004/0267992 | A1 | 12/2004 | Stuber et al. |
| 2006/0288143 | A1 | 12/2006 | Clark |

* cited by examiner

*Primary Examiner* — Clifford Knoll

(57) ABSTRACT

A bus arbitration system, a method of connecting a master device and a peripheral over a bus system of an IC and an IC is provided. In one embodiment, the bus arbitration system includes: (1) a bus system configured to couple master devices to peripherals, port arbiters coupled to the bus system, wherein each of the port arbiters uniquely corresponds to one of the peripherals and is configured to manage access to the uniquely corresponding peripheral and a request splitter configured to receive connection requests from the master devices for the peripherals and direct the connection requests to a specific one of the port arbiters according to a port identifier associated with each of the connection requests.

23 Claims, 4 Drawing Sheets

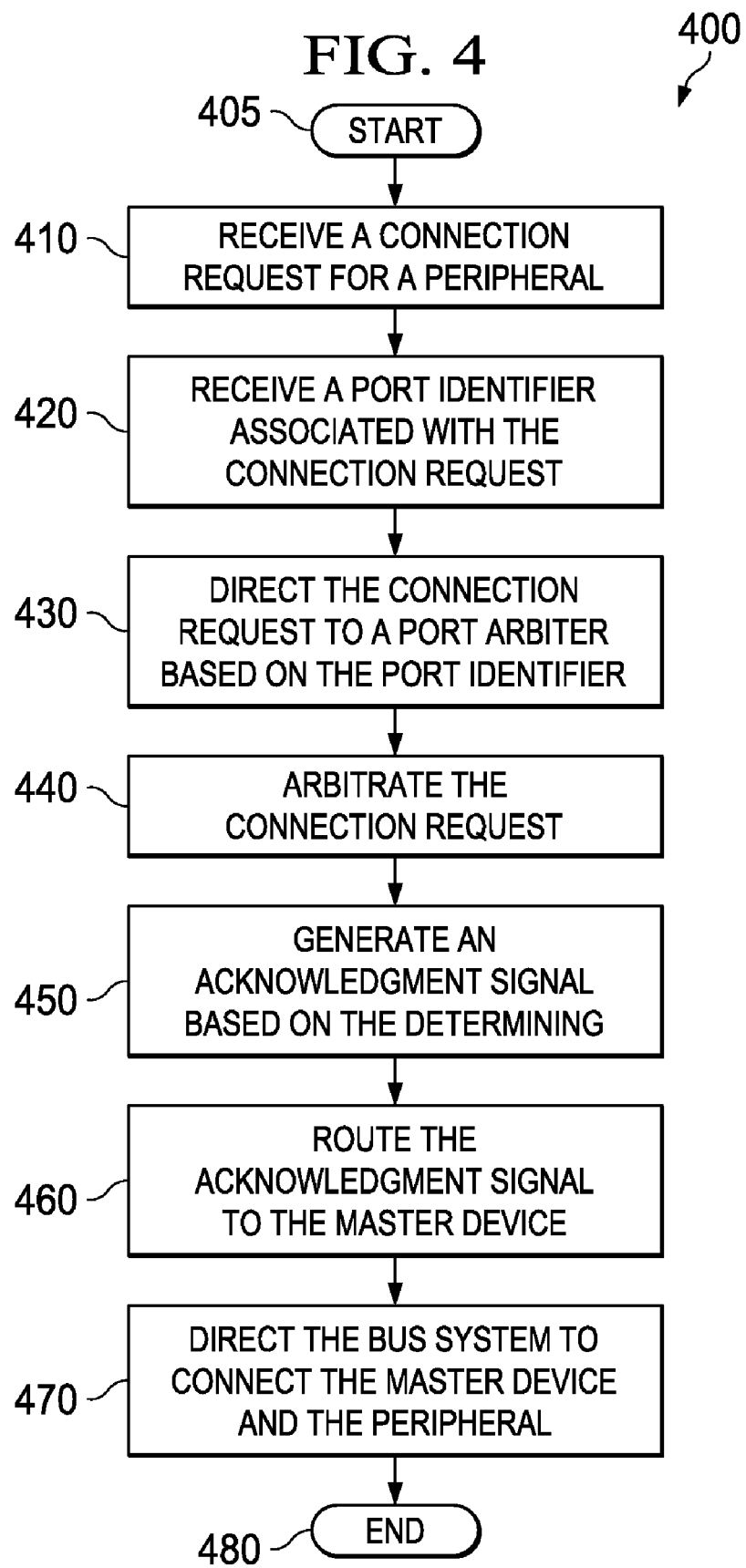

BUS ARBITRATION SYSTEM, A METHOD OF CONNECTING DEVICES OF AN IC EMPLOYING A BUS SYSTEM AND AN IC

TECHNICAL FIELD

This application is directed, in general, to establishing connections via a bus between master devices and peripherals and, more specifically, to providing effective bus utilization.

BACKGROUND

Data buses are used in integrated circuits (ICs) to connect a plurality of master devices, such as user-controlled microprocessors, to a plurality of peripherals, such as memories. For example, a data bus may be an Advanced High-performance Bus (AHB) from ARM Limited of Cambridge, England. Additionally, the data bus may be an Advanced Microcontroller Bus Architecture (AMBA) that uses an Extended Interface (AXI) protocol from ARM.

To avoid overlapping data messages transferred from the master devices to the peripherals, an arbiter is often used to manage traffic on the data bus. In bus systems such as AHB or AXI, only one master can have active access to the bus at a time for a connection to a peripheral connected to the bus.

SUMMARY

One aspect provides a bus arbitration system for an IC. In one embodiment, the bus arbitration system includes: (1) a bus system configured to couple master devices to peripherals, port arbiters coupled to the bus system, wherein each of the port arbiters uniquely corresponds to one of the peripherals and is configured to manage access to the uniquely corresponding peripheral and a request splitter configured to receive connection requests from the master devices for the peripherals and direct the connection requests to a specific one of the port arbiters according to a port identifier associated with each of the connection requests.

In yet another aspect, a method of connecting a master device and a peripheral over a bus system of an IC is provided. In one embodiment, the method includes: (1) receiving a connection request from a master device for a peripheral, (2) receiving a port identifier from the master device that is associated with the connection request and (3) directing the connection request, based on the port identifier, to a port arbitrator that is uniquely associated with the peripheral.

In still another aspect, an IC is provided. In one embodiment, the IC includes: (1) master devices, (2) peripherals, (3) a bus system configured to couple the master devices to the peripherals and (4) a bus arbitration system, having: (4A) port arbiters coupled to the bus system, wherein each of the port arbiters uniquely corresponds to one of the peripherals and is configured to manage access to the uniquely corresponding peripheral and (4B) a request splitter configured to receive connection requests from the master devices for the peripherals and direct the connection requests to a specific one of the port arbiters according to a port identifier associated with each of the connection requests.

BRIEF DESCRIPTION

Reference is now made to the following descriptions taken in conjunction with the accompanying drawings, in which:

FIG. 4 is an illustration of a flow diagram of an embodiment of a method of connecting a master device to a peripheral via a bus system of an IC carried out according to the principles of the disclosure.

DETAILED DESCRIPTION

The disclosure provides individual peripheral level arbiters that allow a bus of an IC to be split separately to each peripheral so that multiple master devices can simultaneously communicate over the bus to different peripherals. Instead, of a single bus arbiter, the disclosure provides an arbiter for each port of the bus. Thus, each peripheral connected to the bus has an individual arbiter that can control connections thereto. Multiple master devices, therefore, can access a bus simultaneously.

Figure 1:
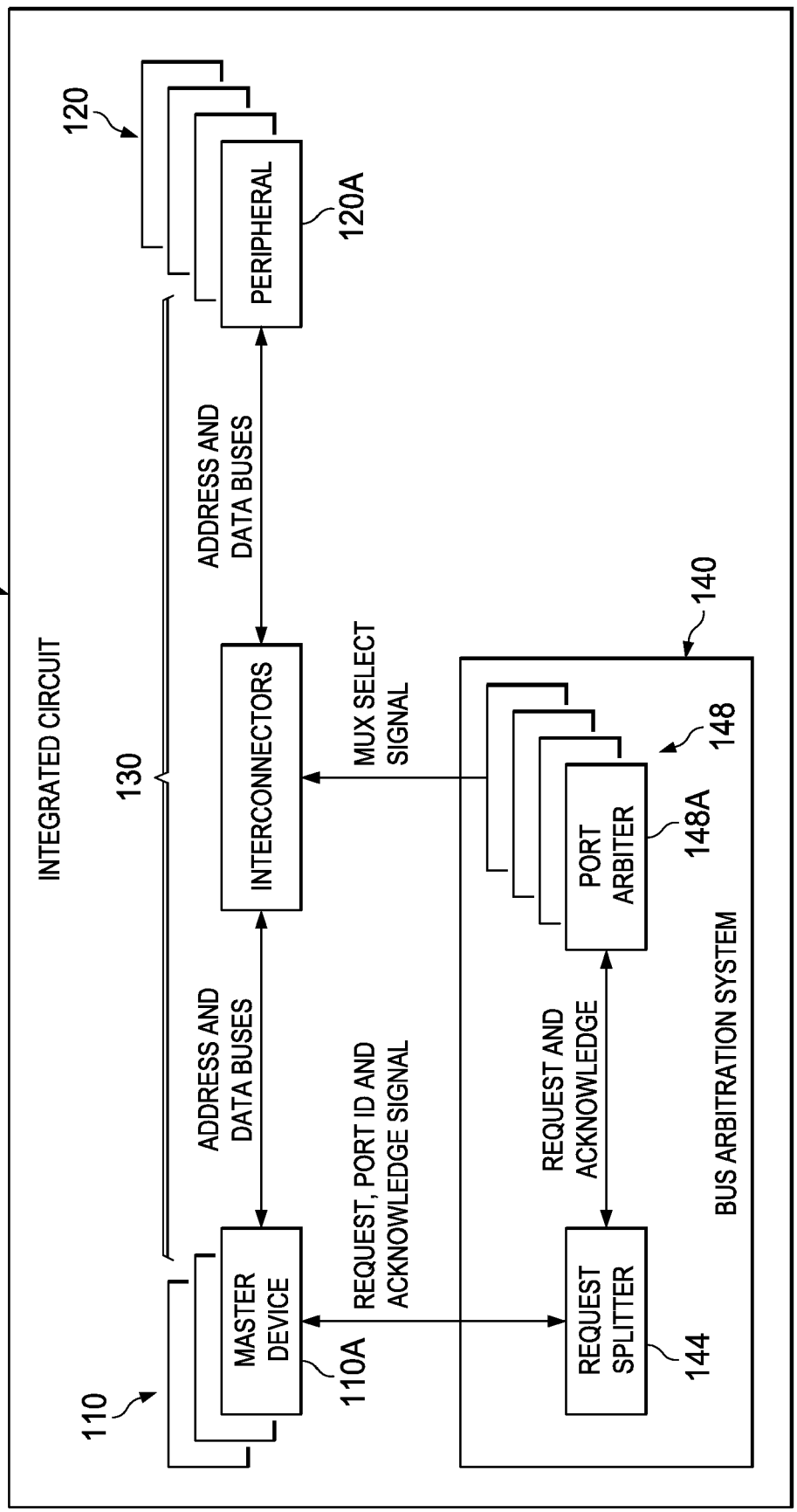
FIG. 1 is an illustration of a block diagram of an embodiment of an IC constructed according to the principles of the disclosure.

FIG. 1 is a block diagram of an embodiment of an IC 100 constructed according to the principles of the disclosure. The IC 100 includes a plurality of master devices 110, a plurality of peripherals 120, a bus system 130 and a bus arbitration system 140. The IC 100 can include additional components or devices, such as a clock, that may be included in an IC. The master devices 110 are capable of initiating data transfers with the peripherals 120 via the bus system 130 by providing address and control information. The peripherals 120 are capable of providing the data requested according to the address and control information. Address and data buses may be used to transmit the addresses and the data, respectively.

The master devices and peripherals may be conventional devices typically included in an IC. For example, the master devices may be microprocessors. Additionally, the peripherals may include an Ethernet MAC, memories, memory controllers, a bus extension or slave devices that are used to control peripherals. Master device 110A and peripheral 120A are denoted to represent the plurality of master devices and peripherals, respectfully.

The bus system 130 is configured to couple the plurality of master devices to the plurality of peripherals to allow the transfer of data therebetween. The bus system 130 may include a plurality of buses, including data and address buses, and controllable interconnectors, such as muxes and demuxes, that are used to connect the master devices 110 and the peripheral devices 120 via the data and address buses. Select signals from the bus arbitration system 140 may be used to direct the bus system 130 to connect the master devices 110 to the desired peripherals 120. For example, the master device 110A may have an address bus and a data bus that is coupled to an address bus and a data bus of the peripheral 120A via the bus system 130.

The bus arbitration system 140 includes a request splitter 144 and a plurality of port arbiters 148. The bus arbitration system 140 is configured to allow multiple of the master devices 110 to conduct simultaneous transactions over the data buses to different ones of the peripherals 120. The request splitter 144 is configured to direct connection requests from the master devices 110 to a particular one of the port arbiters 148 based on port identifiers received with the connection requests. A connection requests may be an electrical signal generated by the one of the master devices 110. The request splitter 144 is configured to receive the connection requests and the port identifiers from the master devices 110. Each connection request received by the request splitter 144 also has an associated port identifier from the master devices 110 that indicates which one of the peripherals 120 that the connection request is directed. The request splitter 144 is configured to direct each of the connection requests to a single one of the port arbiters 148 that is associated with the peripheral identified by the port identifier.

The port arbiters 148 (represented by port arbiter 148 A) are configured to control access to the peripherals 120. Each of the port arbiters 148 uniquely correspond (i.e., a one-to-one correspondence) to one of the peripherals 120. For example, port arbiter 148A is solely the arbiter for the peripheral 120A.

The request splitter 144 may be a dedicated hardware device that directs the incoming connection requests to a specific one of the port arbiters 148. The request splitter 144 may also be embodied as a series of operating instructions stored on computer readable storage medium of a computer that directs the operation of the computer. The port arbiters 148 may be simple priority arbiters or round robin arbiters. The various signals transmitted to and from the bus arbitration system 140 may be carried via transmission lines of the IC 100.

Figure 2:
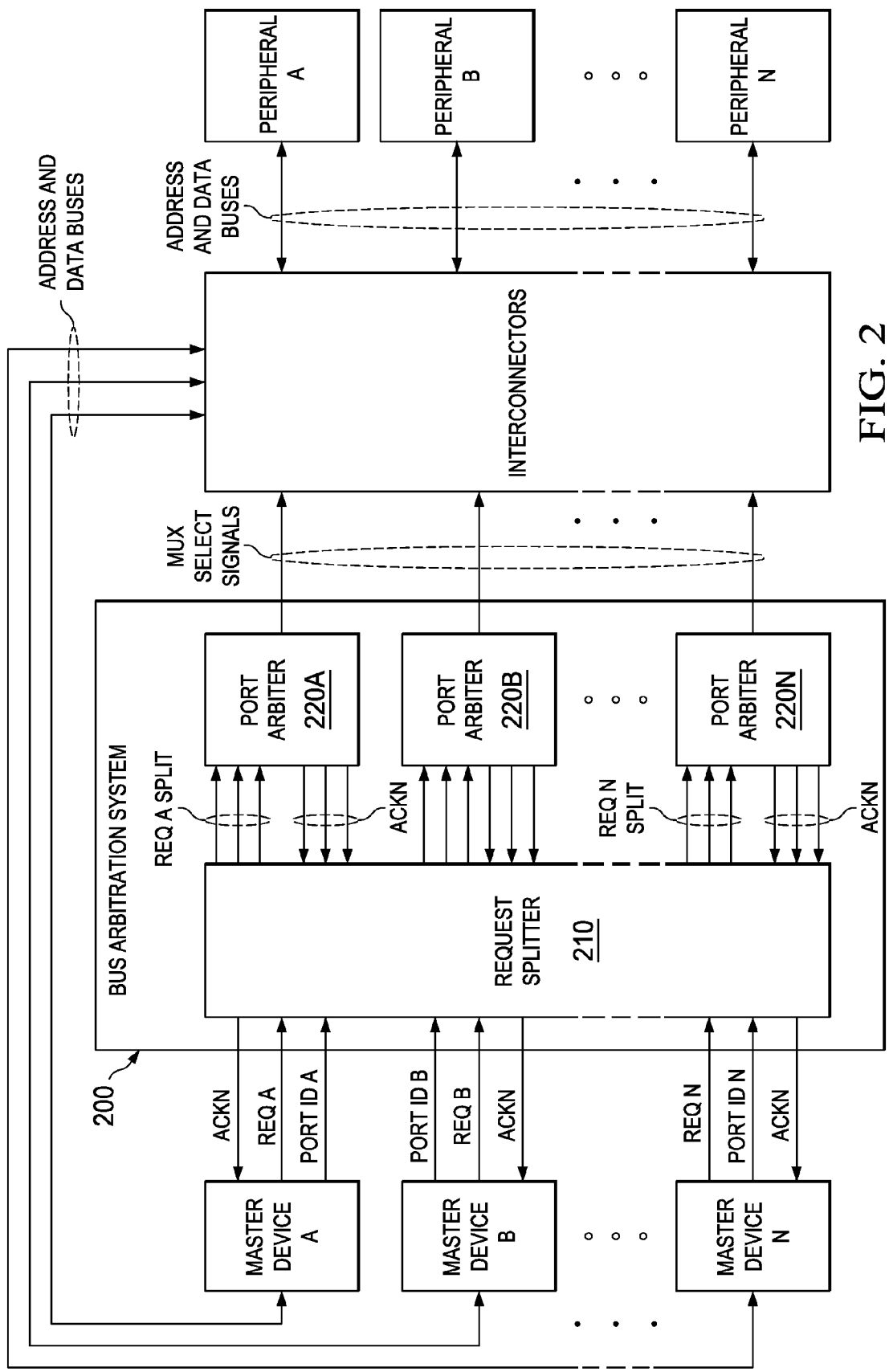
FIG. 2 is an illustration of a block diagram of an embodiment of a bus arbitration system constructed according to the principles of the disclosure.

FIG. 2 is a block diagram of an embodiment of a bus arbitration system 200 constructed according to the principles of the disclosure. The bus arbitration system 200 is located in an environment of an IC that includes master devices A-N, a bus system (having interconnectors and buses) and peripherals A-N. In other embodiments, the number of master devices and peripherals may differ. The bus arbitration system 200 includes a request splitter 210 and a plurality of port arbiters, collectively referred to as the port arbiters 220, and represented by port arbiters 220A, 220B and 220N. Each of the port arbiters 220 uniquely correspond to the peripherals A-N. For example, port arbiter A is the arbiter solely for the peripheral A, port arbiter B is the arbiter solely for the peripheral B, and port arbiter N is the arbiter solely for the peripheral N.

The request splitter 210 is configured to receive a connection request and an associated port identifier from a master device and direct the connection request to the appropriate port arbiter according to the port identifier. The port identifier may be a port number. Alternatively, the port identifier may be a designated name. In some embodiments, the port identifier may reflect the peripheral connected to the port.

The port arbiters 220 are configured to arbitrate received connection requests for their respective peripherals and grant access to the respective peripherals based on, for example, the number of connection request for the respective peripherals. The port arbiters 220 may allow connections according to a simple priority scheme or a round robin scheme.

The port arbiters 220 are configured to generate an acknowledgment signal and transmit the acknowledgment signal to the requesting master device via the request splitter 210. The port arbiters 220 are also configured to generate multiplexer select signals to direct the bus system to provide a data path between the requesting master device and the requested peripheral.

The bus arbitration system 200, therefore, uses three signals for a connection handshake. A request signal (REQ), a port ID signal (Port ID) and an acknowledgment signal (ACKN). On receiving an acknowledgment signal, the requesting master device can perform a data transfer to the specific peripheral.

For example, the request splitter 210 may receive a connection request (REQ) and a port identifier (PORT A) from master device A. The request splitter 210 may direct the connection request (REQ) to port arbiter 220A according the port identifier received with the connection request. The port arbiter 220A may determine the connection request can be allowed and generates an acknowledgment signal to the master device A to notify master device A that a connection can be made. Additionally, the port arbiter 220A generates multiplexer select signals to direct the bus system to establish a data path between the master device A and the peripheral A.

Figure 3:
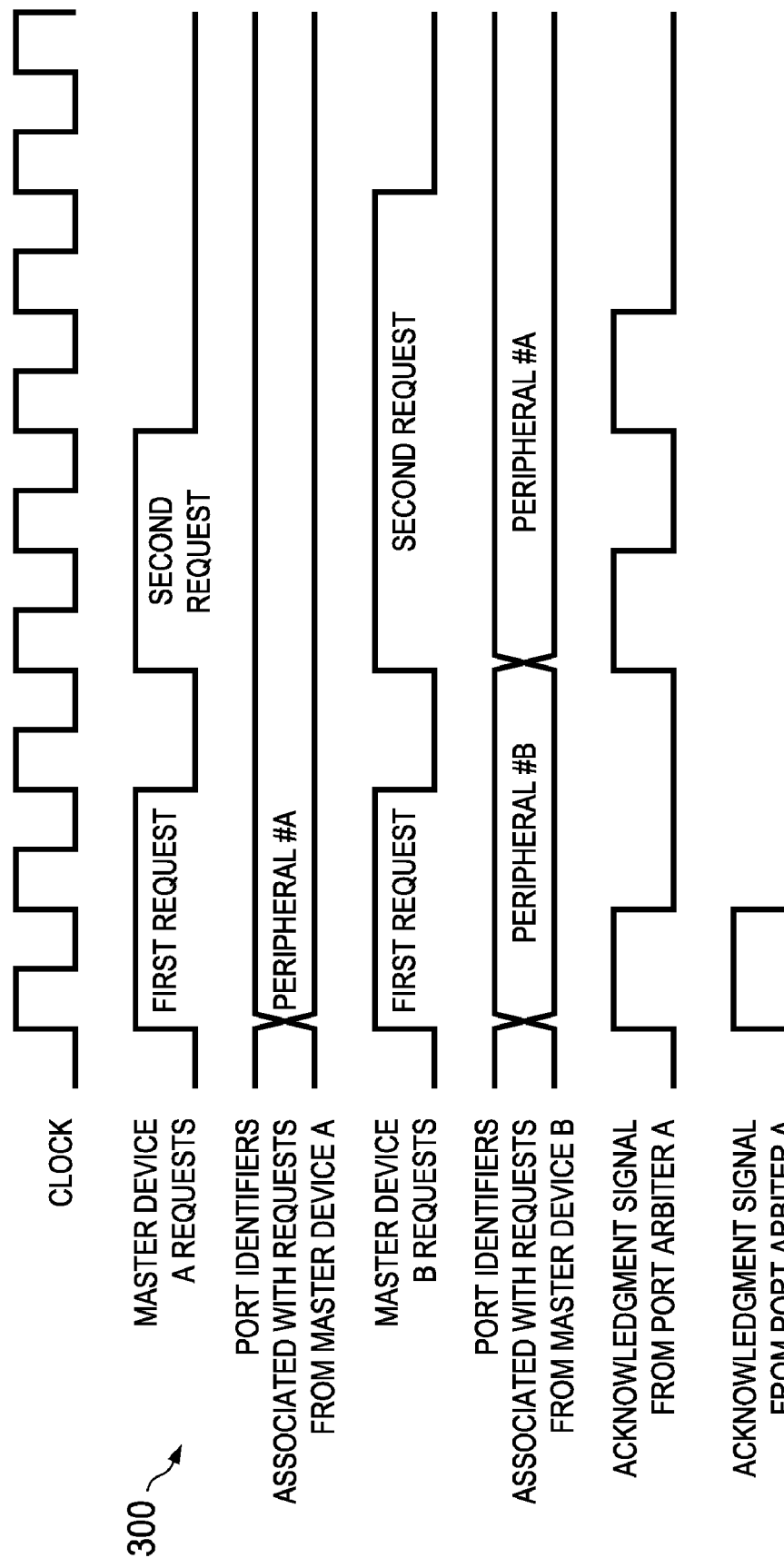
FIG. 3 illustrates a timing diagram of an embodiment of a bus arbitration system constructed according to the disclosure.

FIG. 3 illustrates a timing diagram 300 representing the operation of an embodiment of a bus arbitration system constructed according to the disclosure. The timing diagram shows the simultaneous accessing feature of an embodiment of a bus arbitration system disclosed herein using two master devices. Master device A, master device B and the peripherals of FIG. 2 will be used for the example.

The top line of the timing diagram 300 includes a clock signal that is used to drive the master devices. The next two lines of the timing diagram 300 represent connection requests from the master device A and the associated port identifier. The fourth and fifth lines of the timing diagram represent connection requests from the master device B and the associated port identifiers. The bottom two lines of the timing diagram 300 represent the acknowledgment signals generated by respective port arbiters.

The timing diagram 300 includes a first connection request that is generated by both master devices A and B for different peripherals. Master device A generates a first connection request for peripheral A and master device B generates a first connection request for peripheral B. Acknowledgment signals are generated for both the master devices allowing access to the different peripherals A and B simultaneously. Port arbiter A generates the acknowledgment signal for master device A and port arbiter B generates the acknowledgment signal for master device B.

Master devices A and B both generate second connection requests that are directed to the same peripheral, peripheral A. In response to the second connection requests, a single acknowledgement signal is initially generated by port arbiter A for the master device A. After servicing the second connection request from the master device A for the peripheral A, the port arbiter A generates an additional acknowledge signal for the master device B for the peripheral A.

FIG. 4 illustrates a flow diagram of an embodiment of a method 400 of connecting a master device and a peripheral over a bus system of an integrated circuit carried out according to the principles of the disclosure. The method 400 begins in a step 405.

In a step 410, a connection request for a peripheral is received from a master device. In a step 420, a port identifier, associated with the connection request, is received from the master device. The connection request is then directed, based on the port identifier, to a port arbitrator that is uniquely associated with the peripheral in a step 430. A request splitter may receive the connection requests and the port identifier and direct the connection request. Additionally, multiple connection requests may be received from multiple master devices. The request splitter can direct each of the multiple connection requests to specific port arbiters uniquely identified by the port identifiers associated with the multiple connection requests.

In a step 440, the port arbiter arbitrates the connection request to the peripheral. The port arbiter may determine if the connection can be allowed. The port arbiter also generates an acknowledgment signal for the connection request based on the determining in a step 450. In a step 460, the acknowledgment signal is routed to the master device. The request splitter may forward the acknowledgment signal from the port arbiter to the requesting master device.

A bus system is then directed to couple the master device to the peripheral in a step 470. To direct the coupling, the port arbiter may generate select signals to control multiplexers of the bus system. Multiple port arbiters may simultaneously direct the bus system to couple multiple master devices to different peripherals. The method 400 then ends in a step 480.

Those skilled in the art to which this application relates will appreciate that other and further additions, deletions, substitutions and modifications may be made to the described embodiments.

What is claimed is:

1. A bus arbitration system for an integrated circuit, comprising:
    a bus system configured to couple master devices to peripherals;
    port arbiters coupled to said bus system, wherein each of said port arbiters uniquely corresponds to one of said peripherals and is configured to solely manage access to said uniquely corresponding peripheral; and
    a request splitter configured to receive connection requests from said master devices for said peripherals and direct said connection requests to a specific one of said port arbiters according to a port identifier associated with each of said connection requests.

2. The bus arbitration system as recited in claim 1 wherein said each one of said port arbiters is configured to allow a connection request only to said uniquely corresponding peripheral.

3. The bus arbitration system as recited in claim 2 wherein said each of said port arbiters is configured to generate an acknowledgment signal in response to a grant of said connection request and send said acknowledgment signal to one of said master devices that requested said connection request.

4. The bus arbitration system as recited in claim 3 wherein said each of said port arbiters is configured to direct said bus system to couple said requesting master device to said uniquely corresponding peripheral in response to said grant.

5. The bus arbitration system as recited in claim 3 wherein said request splitter is configured to forward said acknowledgment signal from said each of said port arbiters to appropriate requesting master devices.

6. The bus arbitration system as recited in claim 1 wherein said port arbiters are configured to simultaneously allow said bus system to couple multiple ones of said master devices to multiple ones of said peripherals.

7. The bus arbitration system as recited in claim 6 wherein each of said multiple ones of said peripherals is a different one of said peripherals.

8. A method of connecting a master device and a peripheral over a bus system of an integrated circuit, comprising:
    receiving a connection request from a master device for a peripheral;
    receiving a port identifier from said master device that is associated with said connection request; and
    directing said connection request, based on said port identifier, to a port arbitrator that is uniquely associated with said peripheral and configured to solely manage access to said uniquely corresponding peripheral.

9. The method as recited in claim 8 further comprising determining by said port arbitrator to allow said connection request to said specific peripheral.

10. The method as recited in claim 9 further comprising generating an acknowledgment signal for said connection request by said port arbitrator based on said determining.

11. The method as recited in claim 10 further comprising routing said acknowledgment signal to said master device.

12. The method as recited in claim 11 further comprising directing a bus system to couple said master device to said peripheral.

13. The method as recited in claim 12 wherein a request splitter coupled to said bus system performs said receiving of said connection request, said receiving of said port identifier and said directing of said connection request.

14. The method as recited in claim 12 further comprising generating select signals by said port arbiter to control multiplexers of said bus system for said directing said bus system to couple said master device to said peripheral.

15. The method as recited in claim 8 further comprising receiving multiple connection requests, receiving multiple port identifiers associated with said multiple connection requests and directing each of said multiple connection requests to specific port arbiters uniquely identified by said multiple port identifiers.

16. The method as recited in claim 15 further comprising said specific port arbiters directing a bus system to simultaneously couple multiple master devices to different peripherals.

17. An integrated circuit, comprising:
    master devices;
    peripherals;
    a bus system configured to couple said master devices to said peripherals; and
    a bus arbitration system, including:
        port arbiters coupled to said bus system, wherein each of said port arbiters uniquely corresponds to one of said peripherals and is configured to manage access to said uniquely corresponding peripheral, wherein access to said uniquely corresponding peripheral is solely managed by said uniquely corresponding arbiter; and
        a request splitter configured to receive connection requests from said master devices for said peripherals and direct said connection requests to a specific one of said port arbiters according to a port identifier associated with each of said connection requests.

18. The integrated circuit as recited in claim 17 wherein said each one of said port arbiters is configured to allow a connection request only to said uniquely corresponding peripheral.

19. The integrated circuit as recited in claim 18 wherein said each of said port arbiters is configured to generate an acknowledgment signal in response to a grant of said connection request and send said acknowledgment signal to one of said master devices that requested said connection request.

20. The integrated circuit as recited in claim 19 wherein said each of said port arbiters is configured to direct said bus system to couple said requesting master device to said uniquely corresponding peripheral in response to said grant.

21. The integrated circuit as recited in claim 20 wherein said request splitter is configured to forward said acknowledgment signal from said each of said port arbiters to appropriate requesting master devices.

22. The integrated circuit as recited in claim 17 wherein said port arbiters are configured to simultaneously allow said bus system to couple multiple ones of said master devices to multiple ones of said peripherals.

23. The integrated circuit as recited in claim 22 wherein each of said multiple ones of said peripherals is a different one of said peripherals.

* * * * *